US010101740B2

(12) United States Patent
Tanaka et al.

(10) Patent No.: US 10,101,740 B2
(45) Date of Patent: Oct. 16, 2018

(54) TRAVEL CONTROL DEVICE FOR WORK VEHICLE, AND WORK VEHICLE

(71) Applicant: HITACHI CONSTRUCTION MACHINERY CO., LTD., Tokyo (JP)

(72) Inventors: Wataru Tanaka, Tokyo (JP); Masanori Ichinose, Tokyo (JP); Shinjiro Saito, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 133 days.

(21) Appl. No.: 15/500,149

(22) PCT Filed: Aug. 20, 2015

(86) PCT No.: PCT/JP2015/073395
§ 371 (c)(1),
(2) Date: Jan. 30, 2017

(87) PCT Pub. No.: WO2016/051988
PCT Pub. Date: Apr. 7, 2016

(65) Prior Publication Data
US 2017/0269591 A1    Sep. 21, 2017

(30) Foreign Application Priority Data

Sep. 29, 2014   (JP) ................................ 2014-199440

(51) Int. Cl.
| | | |
|---|---|---|
| G05D 1/00 | (2006.01) | |
| G05D 1/02 | (2006.01) | |
| E02F 9/20 | (2006.01) | |
| E02F 9/26 | (2006.01) | |

(Continued)

(52) U.S. Cl.
CPC ......... *G05D 1/0022* (2013.01); *G05D 1/0088* (2013.01); *G05D 1/0214* (2013.01);
(Continued)

(58) Field of Classification Search
CPC . E02F 9/2045; E02F 9/20; E02F 9/205; E02F 9/26; E02F 9/207; E02F 9/262;
(Continued)

(56) References Cited

U.S. PATENT DOCUMENTS

| | | | |
|---|---|---|---|
| 7,966,106 B2 | 6/2011 | Sudou et al. | |
| 2001/0022558 A1* | 9/2001 | Karr, Jr. ................. | G01S 1/026 342/450 |

(Continued)

FOREIGN PATENT DOCUMENTS

| | | | |
|---|---|---|---|
| JP | 06-083443 A | 3/1994 | |
| JP | 09-198134 A | 7/1997 | |

(Continued)

OTHER PUBLICATIONS

International Search Report of PCT/JP2015/073395 dated Oct. 6, 2015.

*Primary Examiner* — Behrang Badii
(74) *Attorney, Agent, or Firm* — Mattingly & Malur, PC

(57) ABSTRACT

The travel control system includes: a travel zone holding unit configured to hold a travel zone which is set in a particular travel area set beforehand and over which a dump truck is to autonomously travel; a target position setting unit configured to set, on an outer side of the particular travel area, a target position that the dump truck is to reach; a distance measurement unit configured to measure a traveling distance of the dump truck from a position of the dump truck as acquired using a position acquisition device provided in the dump truck to the target position set by the target position setting unit; and an autonomous travel control unit configured to control the dump truck so that the dump truck moves to an outer side of a travel zone held by the travel zone holding unit and autonomously travels the traveling distance.

6 Claims, 11 Drawing Sheets

(51) Int. Cl.
  *G01C 21/34* (2006.01)
  *G01S 19/12* (2010.01)

(52) U.S. Cl.
  CPC ......... *G05D 1/0223* (2013.01); *G05D 1/0278* (2013.01); *G05D 1/0297* (2013.01); *E02F 9/20* (2013.01); *E02F 9/205* (2013.01); *E02F 9/2045* (2013.01); *E02F 9/26* (2013.01); *G01C 21/34* (2013.01); *G01C 21/3407* (2013.01); *G01C 21/3461* (2013.01); *G01S 19/12* (2013.01); *G05D 1/00* (2013.01); *G05D 2201/0202* (2013.01)

(58) Field of Classification Search
  CPC ...... G05D 1/00; G05D 1/0022; G05D 1/0088; G05D 1/0214; G05D 1/0233; G05D 1/0278; G05D 1/0297; G05D 2201/0202; G05D 1/02; G01C 21/3407; G01C 21/34; G01C 21/3461; G01S 19/12; G01S 19/48; G07C 5/0816; G07C 5/0841; G07C 5/08; G08G 1/096741; G08G 1/096775; G08G 1/096716; G08G 1/096725; G08G 1/0962
  See application file for complete search history.

(56) References Cited

U.S. PATENT DOCUMENTS

| | | | | |
|---|---|---|---|---|
| 2012/0190380 | A1* | 7/2012 | Dupray | G01S 1/026 455/456.1 |
| 2014/0107882 | A1* | 4/2014 | Tojima | E02F 9/2045 701/23 |
| 2014/0316633 | A1* | 10/2014 | Tsujimoto | G05D 1/0223 701/23 |
| 2014/0333771 | A1* | 11/2014 | Mian | B61L 23/00 348/149 |
| 2016/0167650 | A1* | 6/2016 | Clarke | B60W 30/00 701/28 |
| 2016/0223350 | A1* | 8/2016 | Lewis | G01C 21/3407 |

FOREIGN PATENT DOCUMENTS

| | | |
|---|---|---|
| JP | 2000-137522 A | 5/2000 |
| JP | 2008-140375 A | 6/2008 |
| JP | 2009-093308 A | 4/2009 |
| JP | 2014-069647 A | 4/2014 |

* cited by examiner

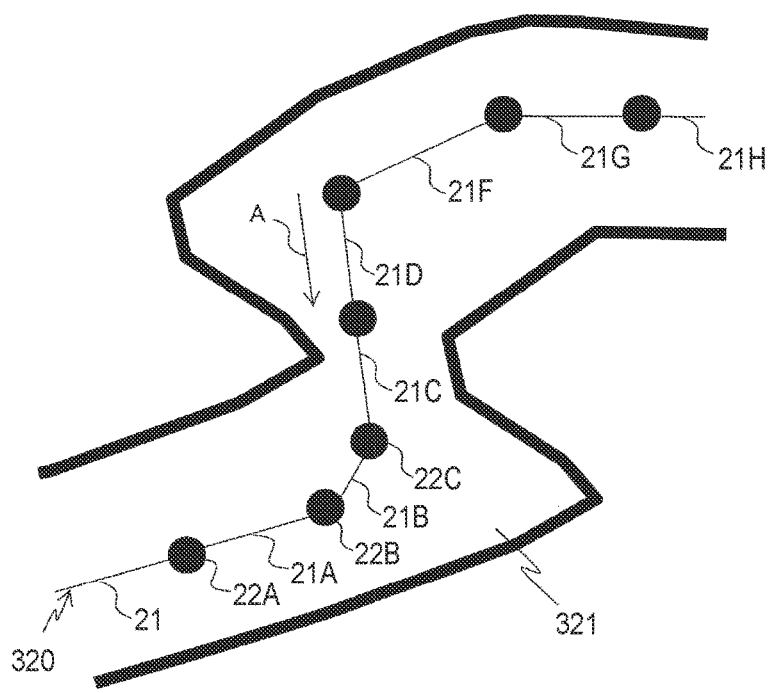
| LINK ID | HEAD NODE ID | TAIL NODE ID | ROUTE-DEMANDED VEHICLE SPEED | ROAD WIDTH | GRADIENT | CURVATURE |
|---|---|---|---|---|---|---|
| 21A | $(x_{22A}, y_{22A})$ | $(x_{22B}, y_{22B})$ | $V_{21A}$ | $W_{21A}$ | $S_{21A}$ | $C_{21A}$ |
| 21B | $(x_{22B}, y_{22B})$ | $(x_{22C}, y_{22C})$ | $V_{21B}$ | $W_{21B}$ | $S_{21B}$ | $C_{21B}$ |

TRAVEL CONTROL DEVICE FOR WORK VEHICLE, AND WORK VEHICLE

TECHNICAL FIELD

This invention relates to a travel control system for a work vehicle, which controls a travel of the work vehicle, and also to a work vehicle.

BACKGROUND ART

As a work vehicle for hauling excavated ore or rock in surface mining or the like, there is known a so-called unmanned work vehicle that autonomously travels without an operator on board. To allow this unmanned work vehicle to autonomously travel, there is a need to calculate the position of the own vehicle. For an own vehicle position calculation system for calculating the position of the own vehicle, inertial navigation arithmetic processing has hence been proposed, which uses outputs from GPS (Global Positioning System) or IMU (Inertial Measurement Unit).

As one of traveling control technologies for such work vehicles, a control system for a guided travel of an unmanned vehicle has been disclosed (see, for example, Patent Document 1). The control system includes: survey line position measuring means for measuring each position of a survey line showing a boundary line of a dumping site; running course generation means for, after obtaining a line normal to the survey line based each of the measured position data of the survey line in the dumping site, generating data of a running course, based on the normal line, in which a target dumping position is positioned at a prescribed distance away from the survey line and a direction of approaching the target dumping position is normal to the survey line; and control means for guiding the unmanned vehicle to travel along the generated running course to the target dumping position, and operating the unmanned vehicle so as to dump a load on the unmanned vehicle at the target dumping position after the unmanned vehicle reaches the target dumping position.

PRIOR ART DOCUMENT

Patent Document

Patent Document 1: U.S. Pat. No. 7,966,106 A

DISCLOSURE OF THE INVENTION

Problem to be Solved by the Invention

According to the above-mentioned conventional technology of Patent Document 1, a mobile survey vehicle is allowed to run along the terrain boundary of the dumping site, boundary data that specify an area in which the work vehicle can run are generated from positions acquired by the mobile survey vehicle, and a target position is set inside the specific running area for allowing the work vehicle to dump a load. However, the setting of a position, which is located outside the specific running area and is adjacent the terrain boundary such as a cliff, as a target position makes it difficult to allow the work vehicle to move to the target position by using the conventional technology of Patent Document 1, because the terrain boundary changes from time to time by operation of the mine, said operation including dumping work by the work vehicle, and for safety reasons, the mobile survey vehicle runs at a place apart from a terrain boundary such as a cliff and generates boundary data of the specific traveling area for the work vehicle. Concerning the travel of the work vehicle to such a target position outside the specific running area, no consideration is made in Patent Document 1. The conventional technology of Patent Document 1, therefore, involves a potential problem that changes in a terrain boundary may not be sufficiently dealt with.

With such circumstances of the conventional technology in view, it is objects of the present invention to provide a travel control system for a work vehicle, which allows the work vehicle to appropriately move to a target position outside a specific running area, and also a work vehicle.

Means for Solving the Problem

To achieve the above-described objects, the present invention is characterized in that in a travel control system for a work vehicle that is connected via a wireless communication network to a traffic control server, which performs operation management, and in accordance with an instruction from the traffic control server, autonomously travels in a particular travel area specified beforehand, said travel control system being to be provided in the work vehicle to control a travel of the work vehicle, and including a travel zone holding unit configured to hold a travel zone which is set in the particular travel area and over which the work vehicle is to autonomously travel; a target position setting unit configured to set, on an outer side of the particular travel area, a target position that the work vehicle is to reach; a distance measurement unit configured to measure a traveling distance of the work vehicle from a position of the work vehicle as acquired using a position acquisition device provided in the work vehicle to the target position set by the target position setting unit; and an autonomous travel control unit configured to control the work vehicle so that the work vehicle moves to an outer side of the travel zone held by the travel zone holding unit and autonomously travels the traveling distance, which has been measured by the distance measurement unit, toward the target position.

Advantageous Effects of the Invention

According to the travel control system and work vehicle according to the present invention, the work vehicle is allowed to appropriately move to a target position outside a particular travel area. Objects, configurations and advantageous effects other than those described above will become apparent from the following description of embodiments.

BRIEF DESCRIPTION OF THE DRAWINGS

FIGS. 3A and 3B are hardware configuration diagrams of a traffic control server and the dump truck in the first embodiment of the present invention, in which FIG. 3A is a diagram illustrating the traffic control server and FIG. 3B is a diagram illustrating the dump truck.

FIGS. 5A and 5B are views illustrating one example of route data to be stored in the traffic control server in the first embodiment of the present invention, in which FIG. 5A is a view schematically illustrating the route data and FIG. 5B is a table showing an illustrative data configuration of the route data.

FIGS. 6A and 6B are side views illustrating how dumping work is performed by the dump truck according to the first embodiment of the present invention, in which FIG. 6A is a view illustrating a state that the dump truck has approached a bund and FIG. 6B is a view illustrating a state that the dump truck has dumped a payload from a body to a bottom of a cliff.

MODES FOR CARRYING OUT THE INVENTION

With reference to the drawings, a description will hereinafter be made about modes for carrying out the travel control system and work vehicle according to the present invention. In the following embodiments, a description will be made by dividing each embodiment into plural sections or embodiments wherever needed for the sake of convenience. When the numbers of elements and the like (including the numbers of parts or components, numerical values, amounts, ranges, and so on) are referred to in the following embodiments, they shall not be limited to any specific numbers and may be greater or smaller than such specific numbers unless specifically indicated or unless apparently limited to such specific numbers in principle. In the following embodiments, their constituent elements (including processing steps and the like) are not absolutely essential unless specifically indicated or unless clearly considered to be essential in principle.

Further, the individual configurations, functions, processing units and the like in the following embodiments may be partly or wholly realized, for example, as integrated circuits or other hardware. Alternatively, the below-described individual configurations, functions, processing units and the like may be realized as programs to be executed on a computer, in other words, may be realized as software. Information on programs, tables, files and the like, which realize the individual configurations, functions, processing units and the like, can be stored in storage devices such as memories or hard disks or storage media such as SD cards or DVDs.

The embodiments of the travel control system and work vehicle according to the present invention will hereinafter be described in detail on the basis of the drawings. It is to be noted that throughout the drawings that show or illustrate the embodiments, members having the same functions are identified by the same or related designations, and their repeated descriptions will be omitted. It is also to be noted that in the following embodiments, the descriptions of the same or similar parts will not be repeated in principle except as specifically needed.

First Embodiment

Figure 1:
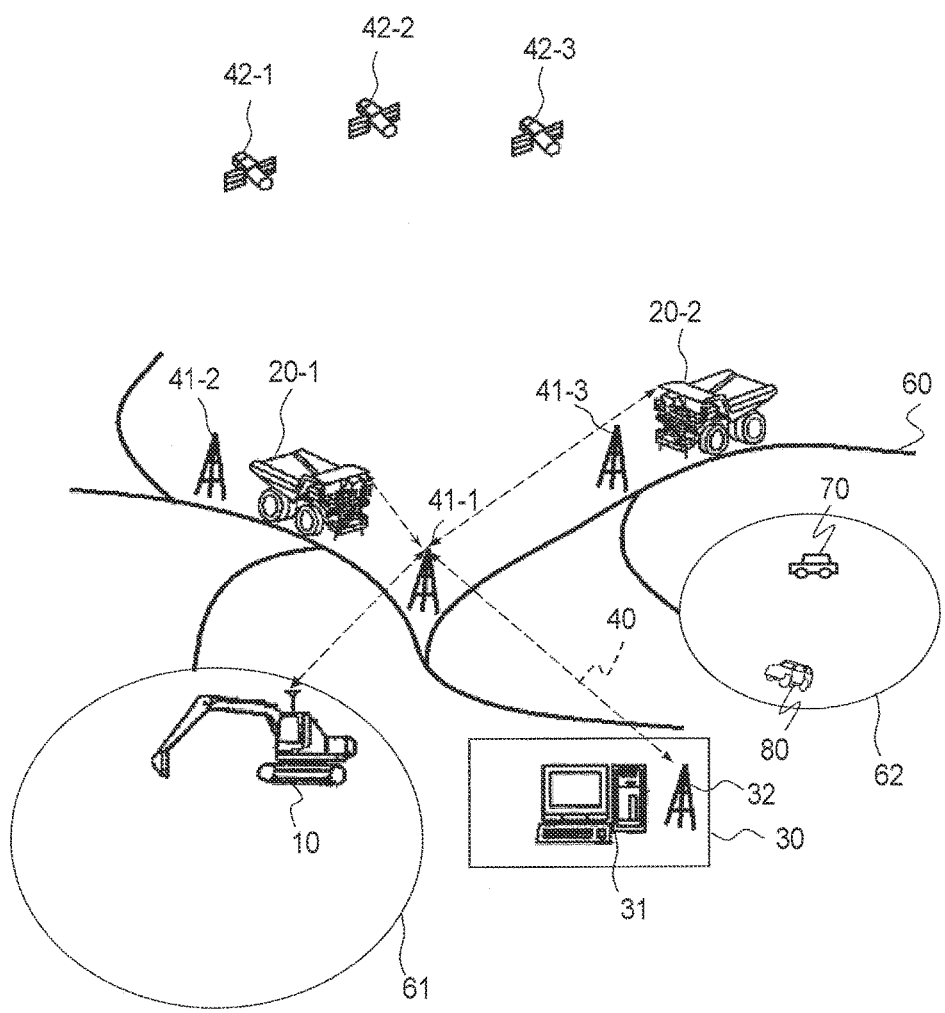
FIG. 1 is a view illustrating schematic configurations in a mine, where a first embodiment of the present invention is used.

Referring to FIG. 1, a description will be made about schematic configurations in a mine, where mining dump trucks (hereinafter abbreviated as "dump trucks" for the sake of convenience) travel as work vehicles each provided with the travel control system according to the first embodiment of the present invention, and with reference to FIG. 2 as needed, schematic configurations of each dump truck will also be described. FIG. 1 is a view illustrating the schematic configurations, and FIG. 2 is an overall view illustrating the configurations of the dump truck.

As illustrated in FIG. 1, a travel route 60 is provided in the mine, and connects a loading site 61 (which corresponds to a loading point) and a dumping site 62 (which corresponds to a dumping point) to each other. At the loading site 61, an excavator 10, which performs loading work of rock or ore, carries out digging work. Dump trucks 20-1,20-2 are each loaded with a payload 1 (see FIG. 2) such as rock or ore by the excavator 10 at the loading site 61, and travel toward the dumping site 62 along the travel route 60.

The dump trucks 20-1,20-2 are connected for communication via a wireless communication network 40 to a traffic control server 31 installed at a traffic control center 31. The dump trucks 20-1,20-2, therefore, travel in accordance with traffic control from the traffic control server 31. Numeral 32 in FIG. 1 designates a wireless antenna connected to the traffic control server 31, while numerals 41-1,41-2,41-3 indicate wireless mobile stations. In the following description, the dump trucks 20-1,20-2 will be referred to as "the dump truck 20" when there is no need to distinguish them from each other.

Figure 2:
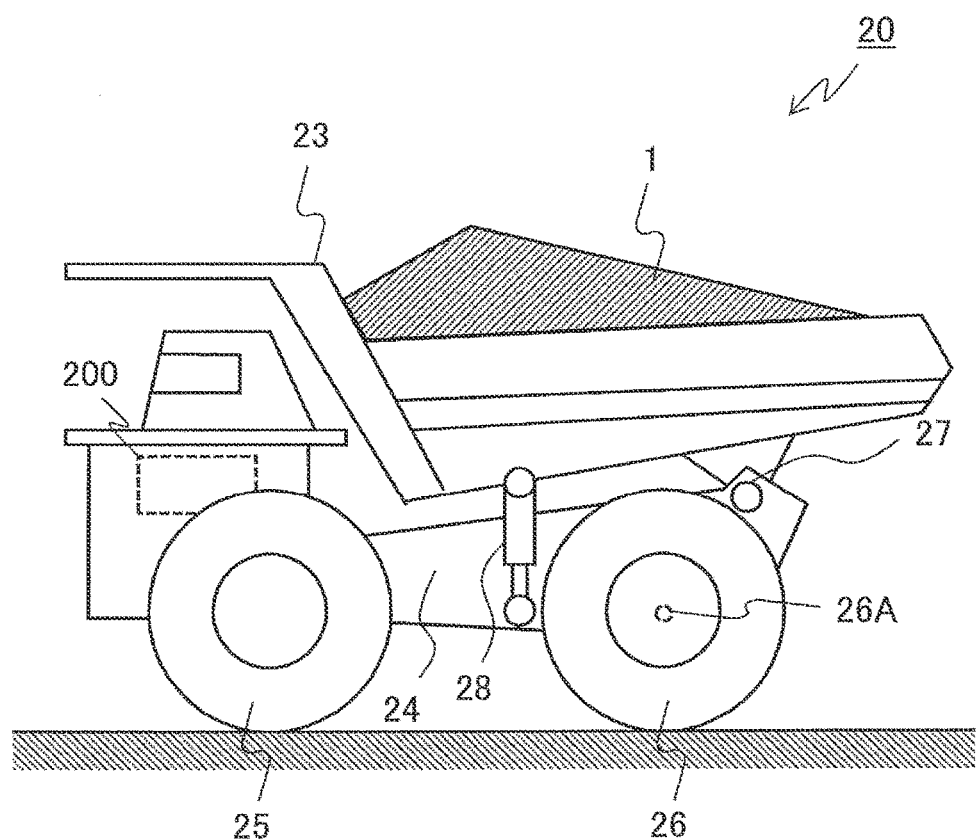
FIG. 2 is an overall view illustrating the configurations of a dump truck according to the first embodiment.

As illustrated in FIG. 2, the dump truck 20 includes a body 23, a frame 24, front wheels 25, and rear wheels 26. The body carries the payload 1 such as rock or ore excavated by the excavator 10. The frame 24 forms the main body of the vehicle, and supports the body. The front wheels 25 are rotatably attached to a front part of the frame 24, and the rear wheels 26 are rotatably attached to a rear part of the frame 24.

The dump truck 20 is also equipped with hinge pins 27, hoist cylinders 28, an antenna (not shown), and a travel control system 200. The hinge pins are provided on the frame 24 at locations near the respective rear wheels 26. The hoist cylinders 28 pivotally raise or lower the body 23 in an up-and-down direction. The antenna is provided on a front part of a top wall of the vehicle, and serves for connection to the wireless communication network 40. The travel control system 200 controls travels of the own vehicle. Specific configurations that indicate functions of this travel control system 200 will be described subsequently herein.

As also illustrated in FIG. 1, the dump truck 20 is provided with a work vehicle position acquisition unit (its illustration is omitted in FIG. 1), which receives positioning radio waves from at least three navigation satellites 42-1, 42-2,42-3 of a global navigation satellite system (GNSS: Global Navigation Satellite System) to acquire the position of the own vehicle.

The traffic control server 31 can calculate (determine) traffic-control-demanded vehicle speeds, which are target vehicle speeds (which are each expressed in terms of a scalar quantity in this embodiment) desired for application to the respective dump trucks 20-1,20-2 during traveling as observed from the traffic control server 31 in view of the traveling positions and target routes of all the dump trucks 20-1,20-2 and the operation target, operation efficiency and the like of the mine, and can notify the traffic-control-demanded vehicle speeds to the respective dump trucks 20-1,20-2. Each traffic-control-demanded vehicle speed is a vehicle speed calculated (determined) by correcting a vehicle speed limit (route-demanded vehicle speed) for each segment on the travel route 60, which has been determined in view of the corresponding curvature of curve, gradient and road width in the map information of the travel route 60, in accordance with the actual state of congestion and operational statuses including the number of operating dump trucks 20.

In the mine, a work vehicle 70 and a mobile survey vehicle 80 are also operating in addition to the excavator 10 and dump trucks 20. The work vehicle 70 serves to perform supervision of whether work is being safely performed at the loading site 61 and dumping site 62. The mobile survey vehicle 80 performs acquisition and collection (so-called surveys while moving) trajectory information as bases for route data 320 to be mentioned subsequently herein (see FIG. 5).

Although not illustrated in the drawing, this mobile survey vehicle 80 receives positioning radio waves from the navigation satellites 42-1,42-2,42-3 of the GNSS and acquires the position (for example, coordinate values) of the own vehicle. The mobile survey vehicle 80 is also provided, for example, with GPS secured at a predetermined position of the vehicle, and stores, as recorded information, the trajectory information acquired by the GPS and including, for example, the position of the own vehicle. The mobile survey vehicle 80 transmits the stored trajectory information at predetermined time intervals to the traffic control center 30 via the wireless communication network 40. It is to be noted that the mobile survey vehicle 80 may use IMU instead of the GPS.

Figure 3A:
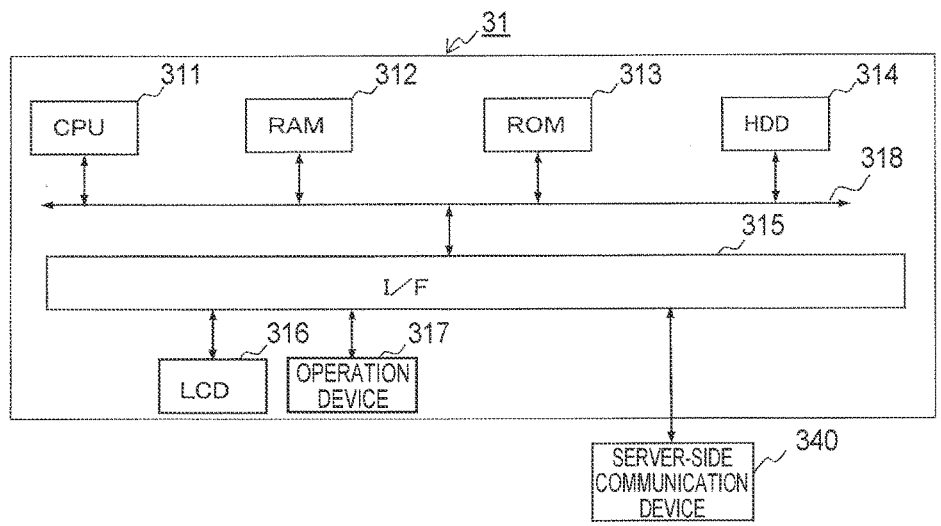
Figure 3B:
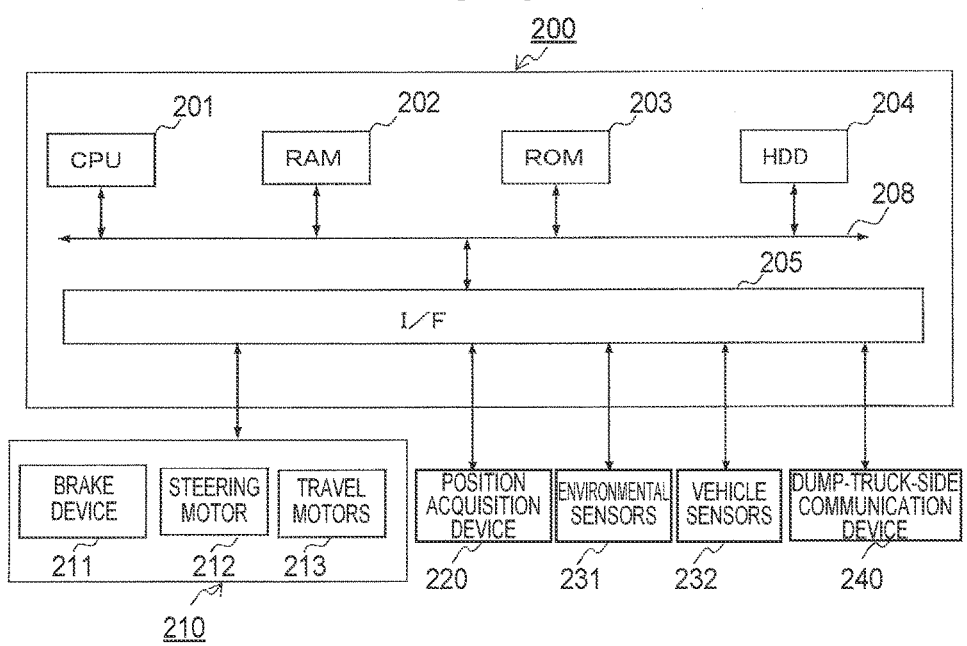

Referring to FIGS. 3A and 3B, a description will next be made about the hardware configurations of the traffic control server 31 and dump trucks 20 in FIG. 1. FIGS. 3A and 3B are hardware configuration diagrams of the traffic control server 31 and each dump truck 20, in which FIG. 3A is a diagram illustrating the traffic control server 31 and FIG. 3B is a diagram illustrating the dump truck 20.

As illustrated in FIG. 3A, the traffic control server 31 includes CPU 311, RAM (Random Access Memory) 312, ROM (Read Only Memory) 313, HDD (Hard Disk Drive) 314, I/F 315, and a bus 318. These CPU 311, RAM 312, ROM 313, HDD 314 and I/F 315 are connected together via the bus 318. The traffic control server 31 is also provided with LCD (Liquid Crystal Display) 316 and an operation device 317, both of which are connected to the I/F 315.

The CPU 311 is an arithmetic logic unit, and controls operations of the entire traffic control server 31. The RAM 312 is a volatile storage medium that can perform high-speed reading and writing, and is used as a working area when the CPU 311 performs processing of information. The ROM 313 is a read-only nonvolatile storage medium, and stores therein an autonomous travel control program that features the first embodiment of the present invention. The HDD 314 is a nonvolatile storage medium that cannot perform reading or writing of information, and stores therein OS (Operating System), various control programs and application programs, and so on.

The LCD 316 is a visual user interface for allowing a user to confirm the traveling state of the dump truck 20 in the mine. The operation device 317 is a user interface for allowing the user to input information in the traffic control server 31, and can be a keyboard, a touch panel stacked on the keyboard or LCD 316, or the like although not illustrated in the drawing. To the I/F 315 of the traffic control server 31, a server-side communication device 340 is connected for connection to the wireless communication network 40.

As illustrated in FIG. 3B, on the other hand, the dump truck 20 is provided with the travel control system 200, travel drive 210, a position acquisition device 220, environmental sensors 231, vehicle sensors 232, and a dump-truck-side communication device 240. The travel drive 210 drives the dump truck 20 to allow it to travel in accordance with a control instruction from the travel control system 200. The position acquisition device 220 acquires the position of the own vehicle of the dump truck 20. The environmental sensors 231 recognize a surrounding environment of the dump truck 20. The vehicle sensors 232 are used to recognize body information. The dump-truck-side communication device 240 serves for connection to the wireless communication network 40.

The travel drive 210 includes a brake device 211, a steering motor 212, and travel motors 213. The brake device 211 applies brakes to the dump truck 20. The steering motor 212 serves to change the steering angle of the dump truck 20. The travel motors 213 allows the dump truck 20 to travel. The position acquisition device 220 is, for example, GPS or IMU, which receives positioning radio waves from the navigation satellites 42-1,42-2,42-3, and acquires the position of the own vehicle.

The environmental sensors 231 include, for example, a millimeter-wave radar device, LIDAR (Laser Imaging Detection and Ranging), and an ultrasonic or like sensor, which serve to detect an object in front of the vehicle as viewed in a traveling direction (advancing direction) These environmental sensors 231 emit electromagnetic waves and an ultrasonic wave toward the object, and receive reflection waves reflected as a result of hitting the object, thereby detecting the state (including the shape), position and the like of the object. The vehicle sensors 232 include, for example, sensors that measure the inclination of the body, the load on the body 23, and the like and a sensor that detects the rotational speed of the front wheels 25 or rear wheels 26. It is to be noted that the environmental sensors 231 may use an object-shooting camera instead of the above-mentioned sensors and that image processing may be applied to an image shot by the camera to detect the state, position or the like of the object.

The travel control system 200 includes CPU 201, RAM 202, ROM 203, HDD 204, I/F 205, and a bus 208. The CPU 201, RAM 202, ROM 203, HDD 204 and I/F 205 are connected together via the bus 208. The travel drive 210, position acquisition device 220, environmental sensors 231, vehicle sensors 232, and dump-truck-side communication device 240 are connected to the I/F 205.

In the hardware configurations described above, the autonomous travel control programs stored in ROMs 203, 313 and HDDs 204,314 or in an unillustrated storage medium such as an optical disk are read by the RAMs 202, 312 and the traffic control server 31 and travel control system 200 are allowed to operate in accordance with control by CPUs 201,311, whereby the autonomous travel control programs (software) and the hardware cooperate to configure functional blocks that realize the functions of the traffic control server 31 and travel control system 200. It is to be noted that, although the configurations of the traffic control server 31 and travel control system 200 have been described based on the combination of the software and hardware, the dump truck 20 in particular may be configured using a logic circuit which realizes the functions of the autonomous travel control program to be performed on the side of the dump truck.

Figure 4:
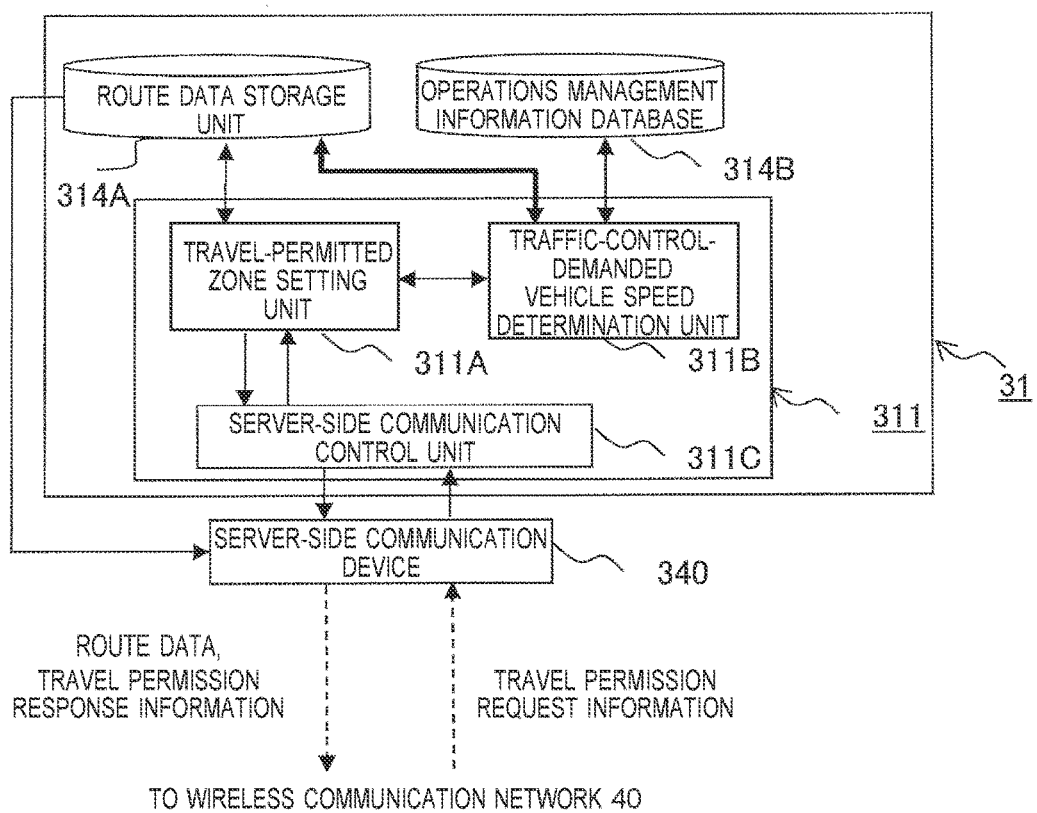
FIG. 4 is a functional block diagram showing main functions of the traffic control server in the first embodiment of the present invention.

With reference to FIG. 4 and FIGS. 5A and 5B, a description will next be made about the functional configurations of the traffic control server 31. FIG. 4 is a functional block diagram showing main functions of the traffic control server. FIGS. 5A and 5B are views illustrating one example of the above-mentioned route data 320 to be stored in the traffic control server 31, in which FIG. 5A is a view schematically illustrating the route data 320 and FIG. 5B is a table showing an illustrative data configuration of the route data 320.

As shown in FIG. 4, the traffic control server 31 is provided with a travel-permitted zone setting unit 311A, a traffic-control-demanded vehicle speed determination unit 311B, a server-side communication control unit 311C, a route data storage unit 314A, and an operation management information database ("database" will hereinafter be abbreviated as "DB") 314B. The travel-permitted zone setting unit 311A, traffic-control-demanded vehicle speed determination unit 311B and server-side communication control unit 311C are configured by autonomous travel control programs which are to be executed at the traffic control server 31.

The route data storage unit 314A is configured using a storage device, such as the HDD 314, that fixedly stores. As illustrated in FIG. 5A, the route date 320 stored in the route data storage unit 314A are defined by position information of individual points (hereinafter called "nodes") 22A, 22B, . . . on the travel route 60 and links 21,21A,21B, . . . that connect the individual nodes. It is to be noted that in the following description, the nodes will be described as "nodes 22" when there is no need to distinguish them from one another and the links will be described as "links 22" when there is no need to distinguish them from one another.

In addition, the terrain information of the mine and/or the absolute coordinates (three dimensional real coordinates calculated based on positioning radio waves of the individual nodes 22) may also be included. To each node 22, identification information (hereinafter called "node ID") that inherently identifies the node is applied. Each node 21 has an advancing direction (the direction of arrow A in FIG. 5A), and a head node and a tail node are defined.

As shown in FIG. 5B, the route data 320 include a link ID (for example, 21A), which inherently identifies each link 21, in association with data of the coordinate values (x22A, y22A) of the head node ID of the link and the coordinate values (x22B,y22B) of the tail node ID of the link, and a route-demanded vehicle speed V21A, road width W21A, gradient S21A and curvature C21A upon traveling on the link.

The route data 320 configured as described above are set over the entirety of a range in which the dump truck 20 should travel in the mine, and the range connected by the nodes 22 and links 21 from a start point to an end point that the dump truck 20 autonomously travels is defined as a travel zone 321 of the dump truck 20. The route data 320 are transmitted by the server-side communication control device 340 to the dump truck 20 via the wireless communication network 40.

The route-demanded vehicle speeds are determined from the road specification and the like, such as gradients, curvatures and road widths, of the route. These route-demanded vehicle speeds serve as candidates for target vehicle speeds when the dump truck actually travels. As operation management information DB 314B, operation management information indicating the positions of each dump truck 20, which is traveling on the travel route 60, is stored. For each dump truck 20, the travel-permitted zone setting unit 311A sets a next travel-permitted zone in accordance with travel permission request information transmitted from the dump truck 20.

Described specifically, the position of another dump truck, which is traveling in front of the dump truck 20, is acquired with reference to the operation management information of the operation management operation DB314B. Referring next to the route data 320 in the route data storage unit 314A, a front boundary point of a travel-permitted zone which is to be set newly is provided at a point rear by at least a distance (stoppable distance), which is needed to stop by applying brakes, from the current position of another dump truck running in front of the dump truck 20 on the travel route 60. In addition, a rear boundary point is set at a position apart by the stoppable distance from the current position of the dump truck 20. The part between the front boundary point and the rear boundary point is then set as the new travel-permitted zone for the dump truck 20 that transmitted the travel permission request.

The traffic-control-demanded vehicle speed determination unit 311B determines a traffic-control-demanded vehicle speed. Described specifically, the traffic-control-demanded vehicle speed determination unit 311B reads the route data 320 from the route data storage unit 314A, and with reference to the operation information stored in the operations management information database 314B, determines the traffic-control-demanded vehicle speed in view of a route-demanded vehicle speed, which corresponds to the link included in the new travel-permitted zone set for the dump truck 20, the distance of the dump truck 20 from the preceding vehicle, and the state of traffic congestion. Normally, a maximum traffic-control-demanded vehicle speed is a vehicle speed set corresponding to a link in the route data 320, and in a traffic congestion, a vehicle speed slower than the maximum traffic-control-demanded vehicle speed is determined as a traffic-control-demanded vehicle speed. The traffic-control-demanded vehicle speed is outputted to the travel-permitted zone setting unit 311A.

The travel-permitted zone setting unit 311A generates travel permission response information, which indicates the front boundary point and rear boundary point of the set new travel-permitted zone and the target vehicle speed, and outputs them to the server-side communication control unit 311C. The server-side communication control unit 311C performs control to receive travel permission request information from each dump truck 20 and to transmit travel permission response information generated responsive to the request.

When the dump truck 20 receives the travel permission response information from the traffic control server 31 configured as described above, the dump truck 20, based on the travel permit response information, autonomously travels in the mine. After reaching the dumping point in the dumping site 62, the dump truck dumps the payload 1 to the bottom of a cliff located at a terrain boundary of the dumping site 62.

Figure 6A:
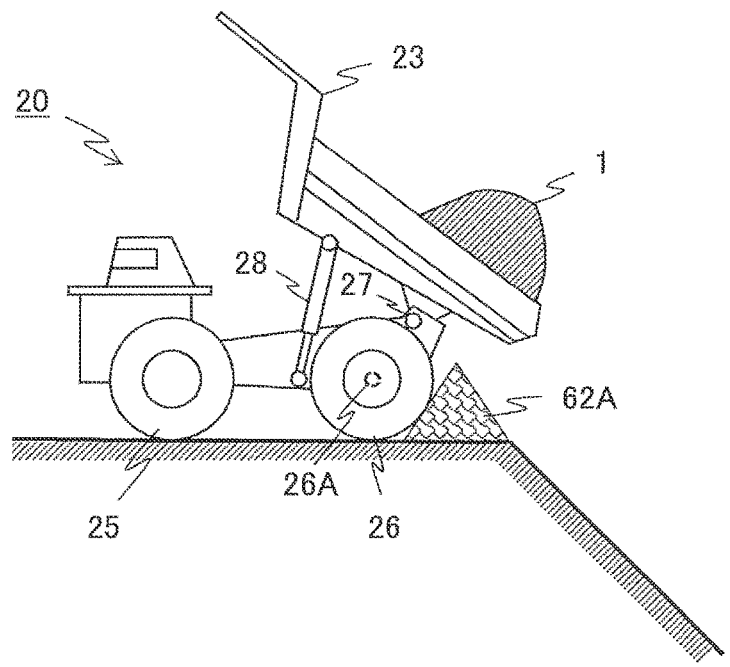
Figure 6B:
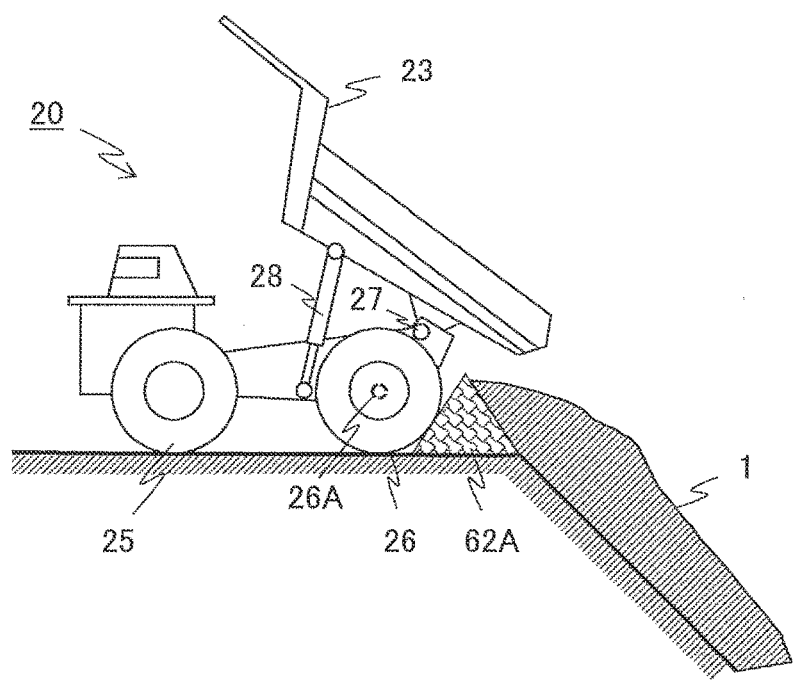

Referring to FIGS. 6A and 6B, a detailed description will next be made of how dumping work is performed by the dump truck 20. FIG. 6A is a view illustrating a state that the dump truck 20 has approached a bund, and FIG. 6B is a view illustrating a state that the dump truck 20 has dumped the payload 1 from the body 23 to the bottom of the cliff.

As illustrated in FIG. 6A, by extending the hoist cylinders 28, the dump truck 20 can dump the payload 1 rearward while gradually raising the body 23 about the hinge pins 27 as pivot fulcrums. Upon dumping the payload 1 to the bottom of the cliff, it is necessary to reverse toward the dumping position and to approach the cliff as close as possible so that a rear edge of the body 23 comes above the cliff. At the dumping site 62 of the mine, a bund 62A is generally provided at an edge of the cliff to prevent vehicles from falling. It is necessary to allow the dump truck 20 to approach the bund 62A to such an extent that its rear wheels 26 come into contact with the bund 62A.

As illustrated in FIG. 6B, on the other hand, the payload 1 dumped to the bottom of the cliff piles up when the dumping of the payload 1 to the bottom of the cliff from the dump truck 20 is repeated a plurality of times. As a consequence, the payload 1 may no longer be fully dumped to the bottom of the cliff even if the dump truck 20 approaches the bund 62A. In this case, the work vehicle 70 such as a bulldozer at the dumping site 62 performs work to newly rebuild the bund 62A at the edge of the cliff. Even if the dump truck 20 tries to dump the payload 1 to the bottom of the cliff, the payload 1 may not be dumped in its entirety to the bottom of the cliff and a portion of the payload 1 may remain on the side of the dumping site 62. In this case, the work vehicle 70 such as the bulldozer performs work to push the payload 1, which has remained on the side of the dumping site 62, down to the bottom of the cliff. After these work have been performed, the position of the bund 62A formed along the terrain boundary of the dumping site 62 changes.

As described above, the position of the bund 62A at the edge of the cliff of the dumping site 62 is presumed to change from time to time as the operation of the mine, including the dumping work by the dump truck 20, goes on. If work is performed to reset the route data 320 by conducting a mobile survey and/or measurements with the mobile survey vehicle 80 or the like whenever needed to guide the dump truck 20 to the bund 62A, the need for this work arises many times, thereby possibly leading to a reduction in the operation efficiency of the mine.

In the first embodiment of the present invention, the mobile survey vehicle 80, therefore, travels beforehand at a place, which is remote from the edge of the cliff of the dumping site 62, to collect trajectory information, whereby a particular travel area 63 (an area on a side inner than a dashed line B in FIG. 8), which indicates an area where the dump truck 20 can autonomously travel in accordance with instructions from the traffic control server 31, is specified, and the travel control system 200 allows the dump truck 20 to autonomously travel in the particular travel area 63 in accordance with instructions from the traffic control server 31 and also allows the dump truck 20 to move to a target position 50 (see FIG. 8) located outside the particular travel area 63.

Figure 7:
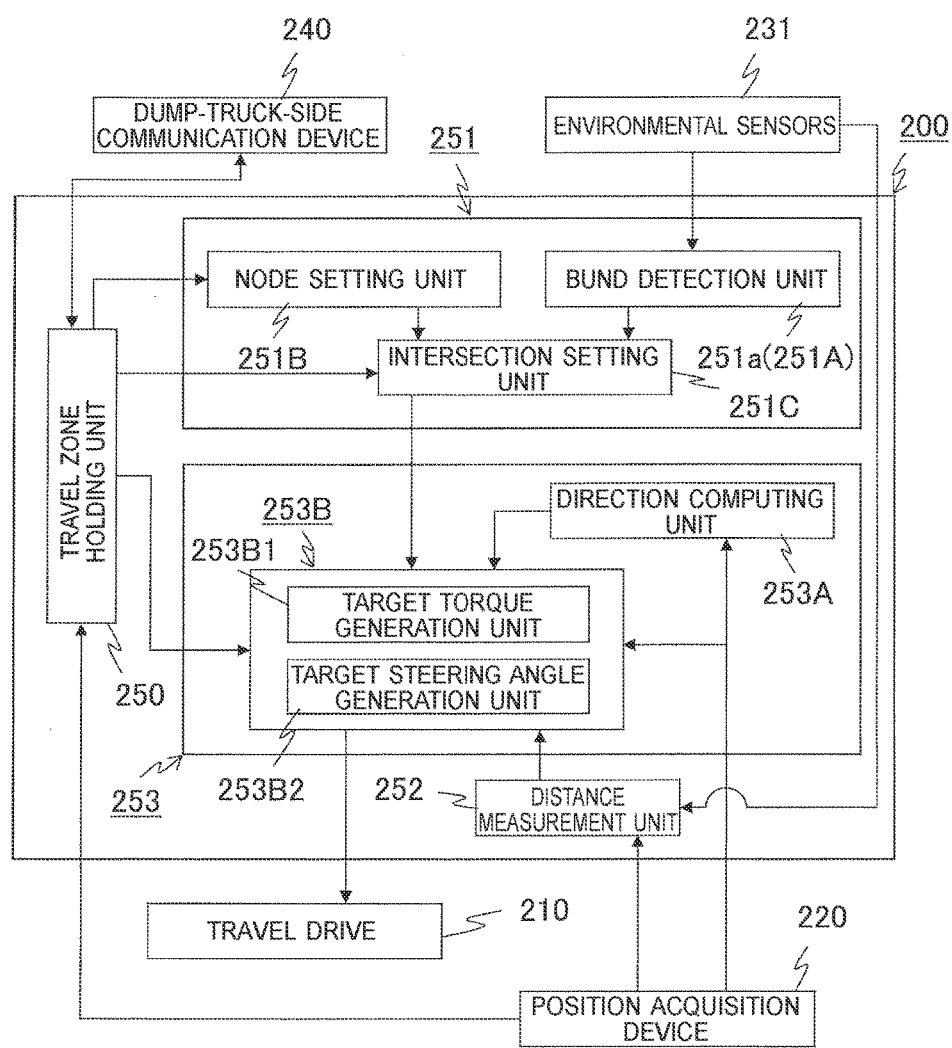
FIG. 7 is a functional block diagram showing configurations of a travel control system according to the first embodiment of the present invention.

With reference to FIG. 7, a detailed description will hereinafter be made about specific configurations that exhibit such functions of the travel control system 200 for the dump truck 20. FIG. 7 is a functional block diagram showing the configurations of the travel control system 200.

As shown in FIG. 7, the travel control system 200 is provided with a travel zone holding unit 250, a target position setting unit 251, a distance measurement unit 252, and an autonomous travel control unit 253.

The travel zone holding unit 250 receives and holds the route data 320 from the traffic control server 31 via the dump-truck-side communication device 240, and transmits the route data 320 to the target position setting unit 251. In addition, the travel zone holding unit 250 collates the received route data 320 with the position of the dump truck 20 as acquired at the position acquisition device 220 and, when the dump truck 20 has come close to the front boundary point of a travel-permitted zone where the dump truck 20 is currently traveling, transmits travel permission request information that requests the setting of a new travel-permitted zone where the dump truck 20 is to travel next. The travel zone holding unit 250 then receives and hold travel permission response information from the traffic control server 31 via the dump-truck-side communication device 240, and transmits the travel permission response information to the autonomous travel control unit 253.

The target position setting unit 251 sets the target position 50 outside the particular travel area 63, which the dump truck 20 is to reach. Described specifically, the target position setting unit 251 includes a stop target object detection unit 251A and a node setting unit 251B. The stop target object detection unit 251A detects a stop target object which serves as a target for stopping the dump truck 20. The node setting unit 251B sets the first node 22a of the plural nodes 22, through which the dump truck 20 passes when moving to the outside of the travel zone 321 (see FIG. 8). The stop target object detection unit 251A is composed, for example, of a bund detection unit 251a that detects the bund 62A to stop the dump truck 20.

This bund detection unit 251a determines, on the basis of a condition of an object detected by the environmental sensors 231, whether the object conforms to the bund 62A at the dumping site 62. As a specific example, the bund detection unit 251a compares the nominal contour of the bund 62A, which has been stored beforehand, to the contour of the object detected by the environmental sensors 231. When the difference between the height or depth of the nominal contour of the bund 62A and the height or depth of the object is within a predetermined value and the difference between the inclination (rising angle) of the nominal contour of the object from the ground surface and the inclination of the object from the ground is within a predetermined value, the object is determined to conform to the bund 62A. The bund detection unit 251a detects the object as the bund 62A when the object is determined to conform to the bund 62A.

Figure 8:
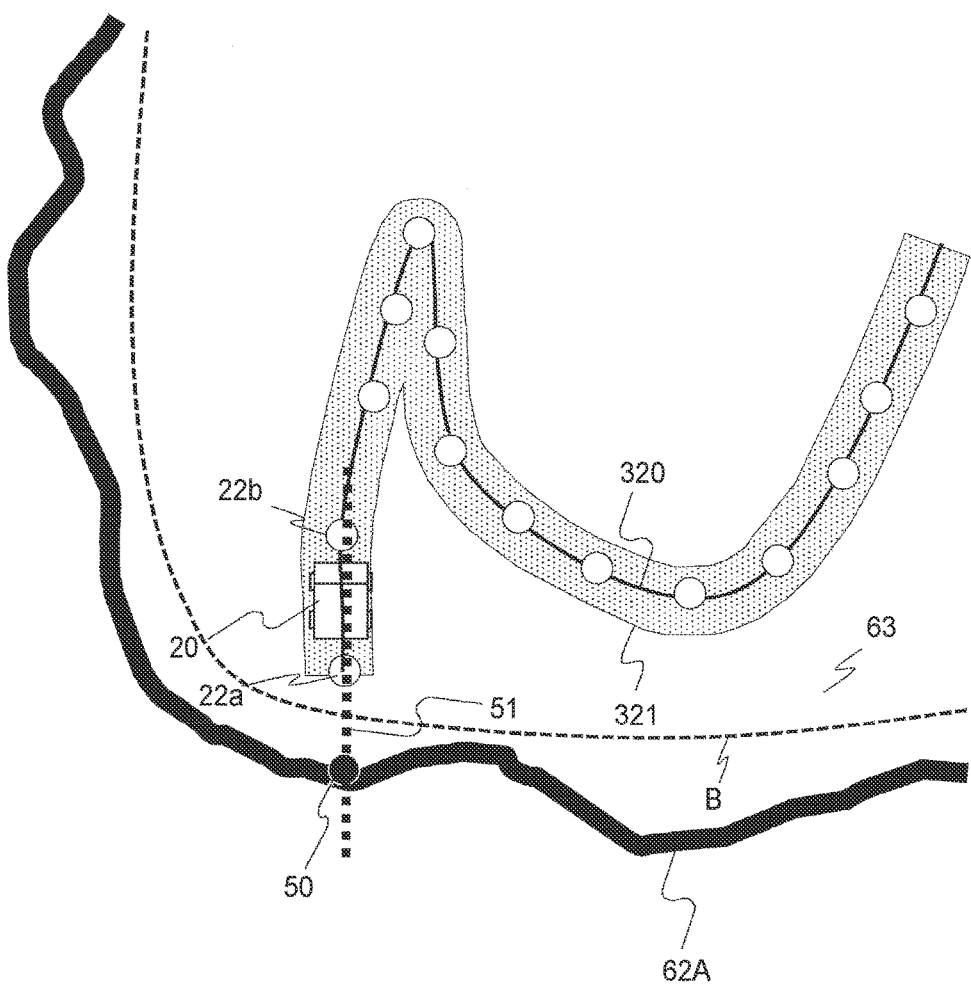
FIG. 8 is a view illustrating configurations relating to the setting of a target position for the dump truck by a target position setting unit in the first embodiment of the present invention.

FIG. 8 is a view illustrating configurations relating to the setting of the target position 50 for the dump truck 20 by the target position setting unit 251.

As illustrated in FIG. 8, the node setting unit 251B receives the route data 320 from the travel zone holding unit 250, and among the plural nodes 22 in the travel zone 321 associated with the route data 320, the terminal node—that indicates the final point from which the dump truck 20 is allowed to autonomously travel to the target position 50 in accordance with instructions from the traffic control server 31—is set as the first node 22a.

As illustrated in FIGS. 7 and 8, the target position setting unit 251 includes an intersection setting unit 251C, which receives the route data 320 from the travel zone holding unit 250 and sets as the target position an intersection 50 between a straight line 51, which connects a second node 22b other than the first node 22a set by the node setting unit 251B and the first node 22a, and the bund 62A detected by the bund detection unit 251a.

In the first embodiment of the present invention, the second node 22b is the node, which is adjacent the first node 22a set by the node setting unit 251B among the plural nodes 22 in the travel zone 321 associated with the route data 320.

In FIG. 7, the distance measurement unit 252 measures the traveling distance of the dump truck 20 from the position of the dump truck 20 as acquired using the position acquisition device 220 to the target position 50 set by the target position setting unit 251. Described specifically, the distance measurement unit 252 determines the traveling distance on the basis of the position of the dump truck 20 as acquired using the position acquisition device 220 and the position of the object as detected by the environmental sensors 231.

The autonomous travel control unit 253 includes a direction computing unit 253A and a target path follow-up unit 253B. The direction computing unit 253A computes the advancing direction of the dump truck 20 that is autonomously traveling. The target path follow-up unit 253B determines the control amounts of driving, braking and steering required for the dump truck 20 to move along the target path in the travel zone 321.

This target path follow-up unit 253B receives the travel permission response information from the travel zone holding unit 250, and in accordance with the target vehicle speed included in the travel permission response information, performs control to allow the dump truck 20 to travel along the target path. The target path follow-up unit 253B has a target torque generation unit 253B1 and a target steering angle generation unit 253B2. The target torque generation unit 253B1 generates a travel motor torque instruction to realize the target vehicle speed. The target steering angle generation unit 253B2 generates a steering angle instruction to realize the target path.

The target torque generation unit 253B1 is fed back with the difference between the target speed and the current speed of the dump truck 20, generates such a travel motor torque instruction as reducing the difference, and transmits the thus-generated travel motor torque instruction to the travel drive 210. The target steering angle generation unit 253B2 is fed back with the positional deviation of the position of the dump truck 20 as acquired at the position acquisition device 220 from the target path, generates such a steering angle instruction as reducing the positional deviation, and transmits the thus-generated steering angle instruction to the travel drive 210.

Consequently, the travel drive 210 drives the brake device 211, steering motor 212 and travel motors 213 in accordance with the travel motor torque instruction and steering angle instruction received from the target torque generation unit 253B1 and target steering angle generation unit 253B2, whereby the dump truck 20 can haul the payload 1 along the travel zone 321 while autonomously traveling to the terminal point.

The autonomous travel control unit 253 controls the dump truck 20 so that it moves to the outside of the travel zone 321 held by the travel zone holding unit 250 and autonomously travels a travel distance, which has been measured by the distance measurement unit 252, toward the target position 50.

Described specifically, as illustrated in FIG. 8, the autonomous travel control unit 253 sets, as a target path, the straight line 51 that connects the first node 22a and the second node 22b set by the node setting unit 251B, and allows the dump truck 20 to autonomously travel along the target path 51 by the traveling distance measured by the distance measurement unit 252. Consequently, the dump truck 20 moves beyond the first node 22a in the travel zone 321 to the target position 50 outside the particular travel area 63. At this time, the autonomous travel control unit 253 allows the dump truck 20 to reach the target position 50 while reversing from the first node 22a.

About control processing by the travel control system 200 according to the first embodiment of the present invention, a description will next be made in detail with reference to FIG. 9.

Figure 9:
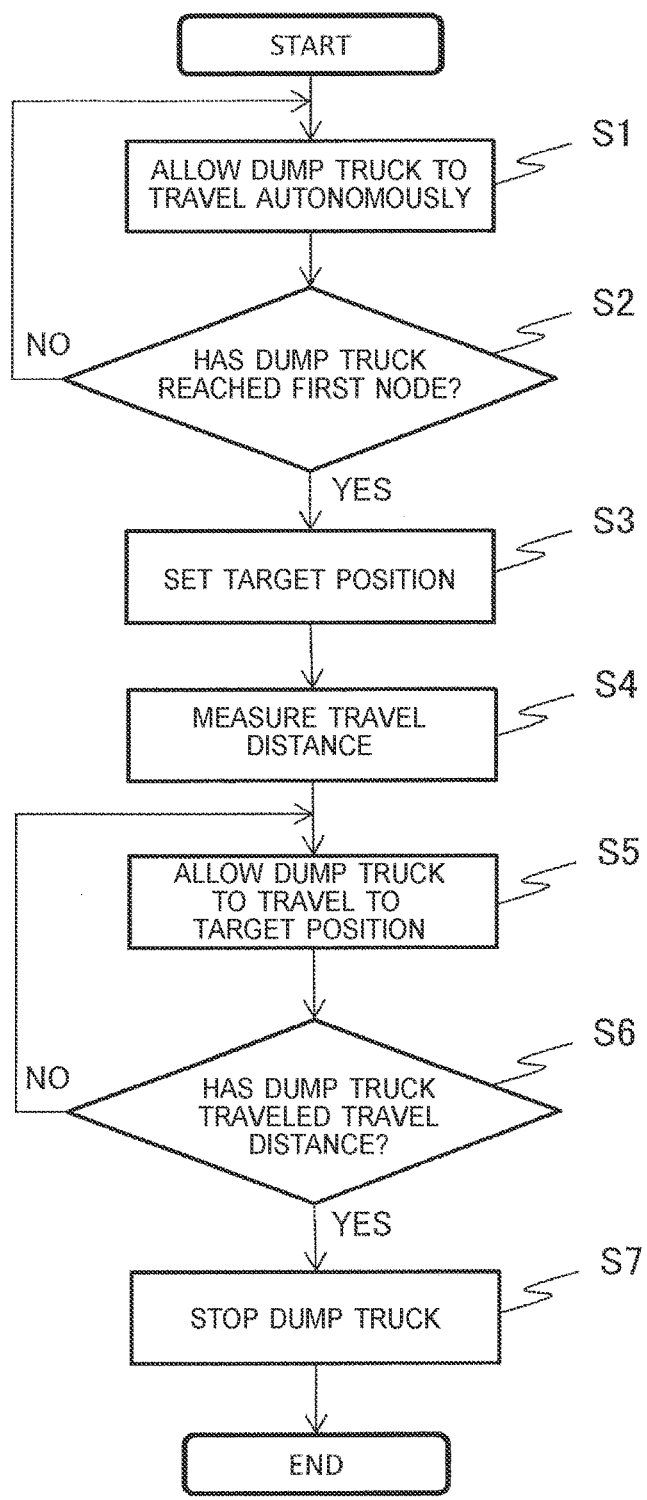
FIG. 9 is a flow chart illustrating the overall flow of control processing by the travel control system according to the first embodiment of the present invention.

FIG. 9 is a flow chart illustrating the overall flow of the control processing by the travel control system 200.

As illustrated in FIG. 9, the autonomous travel control unit 253 of the travel control system 200 first drives the brake device 211, steering motor 212 and travel motors 213 in the travel drive 210 in accordance with instructions from traffic control server 31, whereby the dump truck 20 is allowed to autonomously travel along the travel zone 321 held by the travel zone holding unit 250 [step (hereinafter referred to as "S") 1].

With reference to the position of the dump truck 20 as acquired using the position acquisition device 200, the travel control system 200 next determines whether the dump truck 20 has reached the node 22a as the terminal point of the travel zone 321 (S2). If the dump truck 20 is determined to have not reached the first node 22a (S2/NO) at this time, the autonomous travel control unit 253 repeats the control processing from S1.

If the travel control system 200 determines in S2 that the dump truck 20 has reached the first node 22a (S2/YES), on the other hand, the target position setting unit 251 of the travel control system 200 sets the target position 50, to which the dump truck 20 is to reach, outside the particular travel area 63 (S3). Further, the distance measurement unit 252 of the travel control system 200 measures the traveling distance from the position of the dump truck 20, which has been acquired using the position acquisition device 220, to the target position 50 set by the target position setting unit 251 (S4).

The autonomous travel control unit 253 next drives the brake device 211, steering motor 212 and travel motors 213 of the travel drive 210, whereby the dump truck 20 is allowed to autonomously travel from the first node 22a toward the target position 50 by the traveling distance measured by the distance measurement unit 252 (S5). Subsequently, the autonomous travel control unit 253, with reference to the position of the dump truck 20 as acquired using the position acquisition device 220, determines whether the dump truck 20 has traveled the distance measured by the distance measurement unit 252 (S6).

If the autonomous travel control unit 253 determines at this time that the dump truck 20 has not traveled the traveling distance measured by the distance measurement unit 252 (S6/NO), the control processing from S5 is repeated. If the autonomous travel control unit 253 determines that the dump truck 20 has traveled the traveling distance measured by the distance measurement unit 252 (S6/YES), on the other hand, the brake device 211 of the travel drive 210 is driven, whereby the dump truck 20 is allowed to stop at the bund 62A at the target position 50 (S7) and the control processing by the travel control system 200 according to the first embodiment of the present invention ends.

According to the travel control system 200 and dump truck 20 according to the first embodiment of the present invention, which are configured as described above, the dump truck 20 is allowed by the autonomous travel control unit 253 to move from the first node 22a to the target position 50 outside the particular travel area 63 along the target path 51 even if the target position 50 is set outside the particular travel area 63 in view of changes of the bund 62A at the dumping site 62 due to operation and the like of the mine, including dumping work by the dump truck 20. The dump truck 20 then travels the traveling distance measured by the distance measurement unit 252, and stops exactly at the bund 62A which is equivalent to the target position 50. Accordingly, the payload 1 on the body 23 can be dumped to the bottom of the cliff.

As has been described above, the first embodiment of the present invention allows the dump truck 20 to appropriately move to the target position 50 outside the particular travel area 63 so that sufficient measures can be taken for changes of the bund 62A at the dumping site 62 due to operation of the mine. Consequently, the operation efficiency of the mine can be heightened.

In the first embodiment of the present invention, the intersection setting unit 251C sets, as the target position, the intersection 50 between the straight line 51, which connects the first node 22a and the second node 22b set by the node setting unit 251B, and the bund 62A detected by the bund detection unit 251a, whereby the autonomous travel control unit 253 can easily set the straight line 51, which extends through the respective nodes 22a,22b and the target position 50, as a target path that allows the dump truck 20 to autonomously travel outside the particular travel area 63.

In particular, the second node 22b connected to the first node 22a via the straight line 51 at the intersection setting unit 251C is a node located adjacent the first node 22a. It is, therefore, only necessary for the dump truck 20 to travel to the terminal point of the travel zone 321 and then to move straight as it is to the outside of the travel zone 321. The dump truck 20 is hence allowed to move to the target position 50. Consequently, the stability of the dump truck 20 in autonomous traveling can be heightened.

In the first embodiment of the present invention, upon moving from the first node 22a, which corresponds to the terminal point of the travel zone 321, to the target position 50 outside the particular travel area 63, the dump truck 20 can reach the target position 50 while reversing by the autonomous travel control unit 253, so that the rear wheels 26 are allowed to appropriately stop at the position of the bund 62A at the dumping site 62. Consequently, the dump truck 20 can fully dump the payload 1 from the body 23 to the bottom of the cliff. The remaining amount of the payload 1 at the dumping site 62 therefore decreases, so that the load of pushing work of the payload 1 by the work vehicle 70 can be reduced. As a consequence, the efficiency of dumping work by the dump truck 20 can be improved.

Second Embodiment

Figure 10:
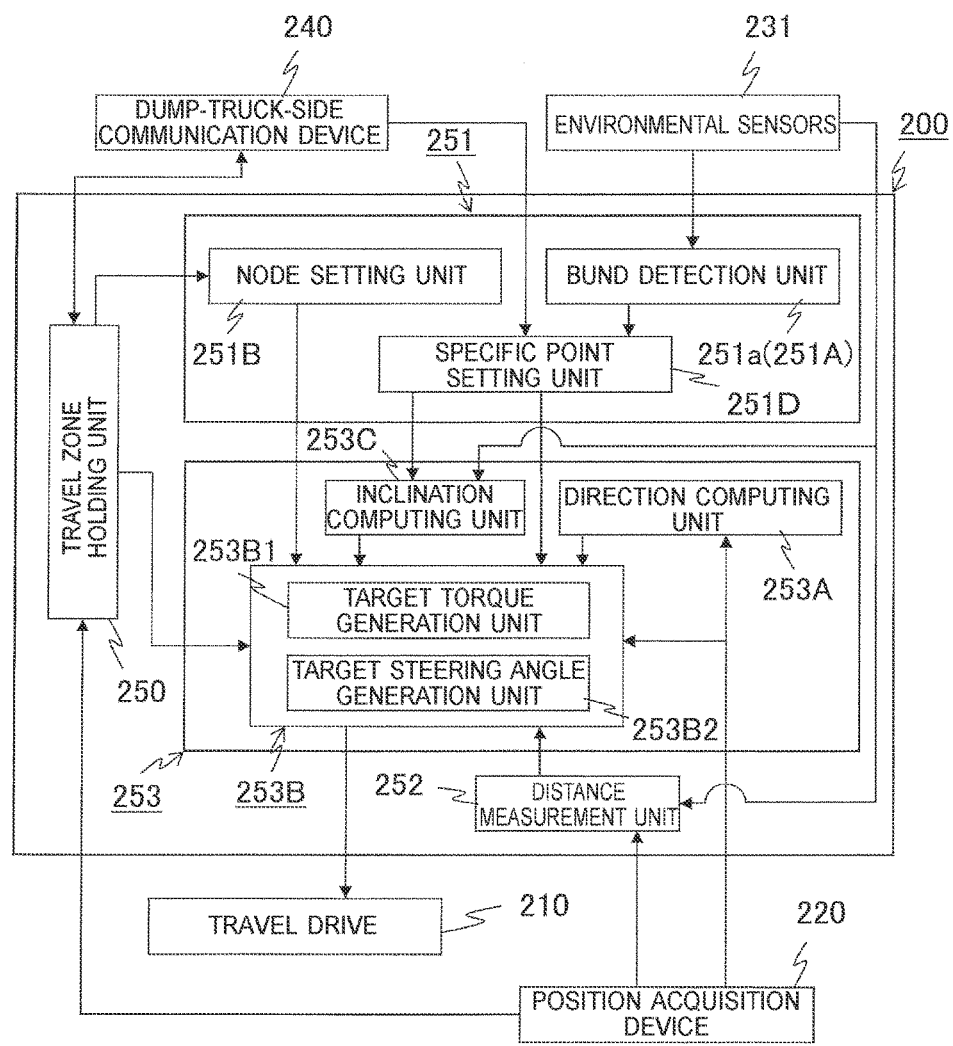
FIG. 10 is a functional block diagram showing configurations of a travel control system according to a second embodiment of the present invention.
Figure 11:
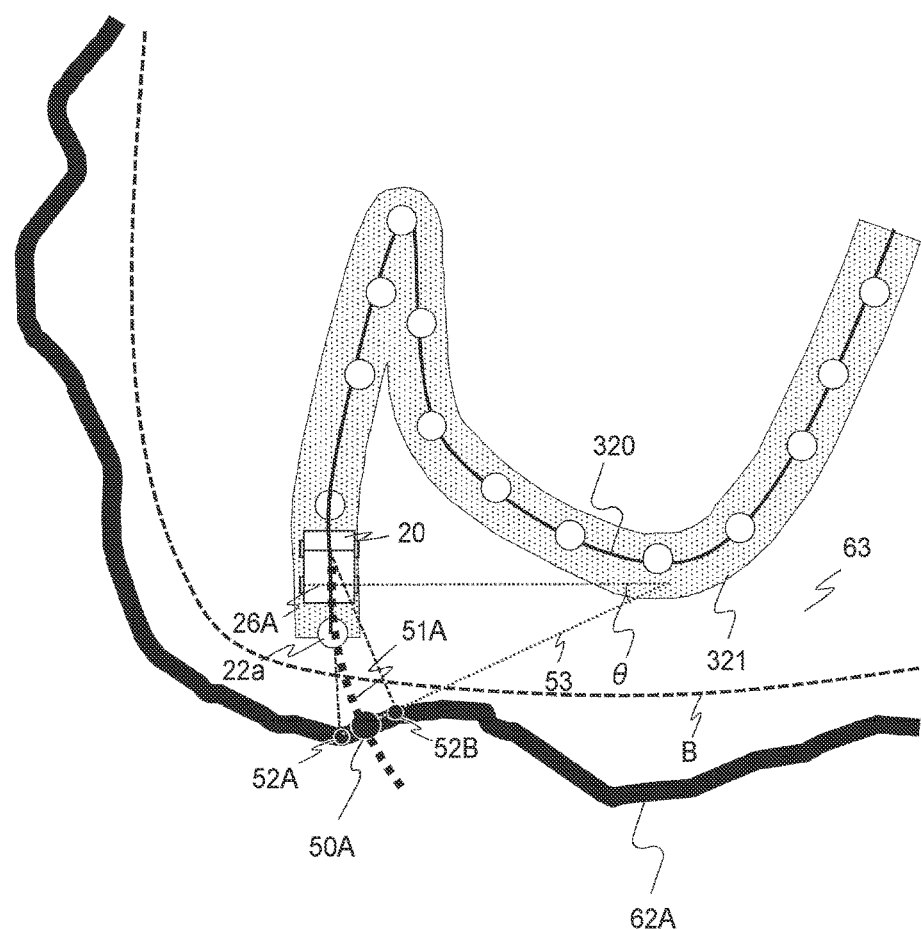
FIG. 11 is a view illustrating configurations relating to the setting of a target position for a dump truck by a target position setting unit in the second embodiment of the present invention.

FIG. 10 is a functional block diagram showing configurations of a travel control system 200 according to a second embodiment of the present invention, and FIG. 11 is a view illustrating configurations relating to the setting of a target position 50A for the dump truck 20 by a target position setting unit 251 in the second embodiment of the present invention.

The second embodiment of the present invention is different from the above-described first embodiment in that the target position setting unit 251 in the first embodiment includes, as illustrated in FIG. 8, the intersection setting unit 251C which sets as the target position the intersection 50 between the straight line 51 connecting together the first node 22a and the second node 22b set by the node setting unit 251B, while the target position setting unit 251 in the second embodiment includes, as illustrated in FIGS. 10 and 11, a specific point setting unit 251D that sets, as a target position, a specific point 50A at the bund 62A to be detected by the bund detection unit 251a.

In this embodiment, an autonomous travel control unit 253 includes an inclination computing unit 253C which computes, for example, an inclination θ to an axle 26A for the rear wheels 26 of the dump truck 20 at the bund 62A detected by the bund detection unit 251a. Further, the autonomous travel control unit 253 allows the dump truck 20 to autonomously travel such that the inclination θ computed by the inclination computing unit 253C becomes smaller when the dump truck 20 has moved to the outside of the travel zone 321 held by the travel zone holding unit 250 and has reached the target position 50A.

Described specifically, the specific point 50A at the bund 62A as set by the specific point setting unit 251D is specified beforehand through the operation device 317 of the traffic control server 31 by an operator in the traffic control center 30. Further, the environmental sensors 231 detects two points 52A,52B. For example, the two points 52A, 52B are spaced from each other as much as the vehicle width of the dump truck 20 at the bund 62A, and flank the target position 50A set by the specific point setting unit 251D. The inclination computing unit 253C also computes the angle θ formed between a straight line 53, which extends through the two points 52A, 52B, and an extension of the axle 26A for the rear wheels 26 of the dump truck 26.

Further, the autonomous travel control unit 253 sets a target path 51A such that the inclination θ computed by the inclination computing unit 253C becomes smaller, for example, as the dump truck 20 approaches the target position 50A set by the specific point setting unit 251D from the first node 22a set by the node setting unit 251B, and allows the dump truck 20 to autonomously travel along the target path 51A by a traveling distance measured by the distance measurement unit 252. As a consequence, the dump truck 20 can move while reversing to the target position 50A outside the specific travel area 63 beyond the first node 22a in the travel zone 321. As the remaining configurations of the second embodiment are similar to the corresponding configurations of the above-described first embodiment, the same or corresponding parts as in the first embodiment are designated by like reference signs, and overlapping descriptions are omitted.

According to the second embodiment of the present invention configured as described above, similar advantageous effects as in the above-described first embodiment can be obtained. In addition, when the dump truck 20 has moved from the first node 22a, which is the terminal point in the travel zone 321, to the target position 50A outside the travel zone 321, the left and right, rear wheels 26 of the dump truck 20 are allowed to rest together on the bund 62A by allowing the dump truck 20 to reverse while changing the direction of the dump truck 20 in accordance with the shape of the bund 62A formed along the cliff of the dumping site 62. Consequently, the dump truck 20 is facilitate to dump the payload 1 from the body 23 to the bottom of the cliff, so that the dumping work by the dump truck 60 can be performed efficiently.

It is to be noted that the above embodiments are described in detail to facilitate the understanding of the present invention and shall not be necessarily limited to those provided with all the configurations described. Further, a part or parts of the configurations of one of the embodiments may be replaced to the corresponding part or parts of the configurations of the other embodiment, or a part or parts of the configurations of one of the embodiments may be added to the configurations of the other embodiment.

In the first embodiment of the present invention, the autonomous travel control unit 253 is described about the case that as illustrated in FIG. 8, the straight line 1, which connects together the first node 22a and the second node 22b set by the node setting unit 251B, is set as a target path. However, the autonomous travel control unit 253 is not limited to the above case, and a curved line may be set as a target path instead of the straight line 51 insofar as a line is formed connecting the first node 22a and the target position 50.

LEGENDS

1 . . . payload, 20,20-1,20-2 . . . dump trucks, 21 . . . links, 22 . . . nodes, 22a . . . first node, 22b . . . second node, 23 . . . body, 24 . . . frame, 25 . . . front wheels, 26 . . . rear wheels, 26A . . . axle, 27 . . . hinge pins, 28 . . . hoist cylinders, 30 . . . traffic control center, 31 . . . traffic control server, 32 . . . wireless antenna, 40 . . . wireless communication network, 50,50A . . . target positions, 51,51A . . . target paths, 52A, 52B . . . points, 53 . . . straight line, 60 . . . travel route, 61 . . . loading site, 62 . . . dumping site, 62A . . . bund, 63 . . . particular travel area, 70 . . . work vehicle, 80 . . . mobile survey vehicle, 200 . . . travel control system, 210 . . . travel drive, 211 . . . brake device, 212 . . . steering device, 213 . . . travel motors, 220 . . . position acquisition device, 231 . . . environmental sensors, 232 . . . vehicle sensors, 240 . . . dump-truck-side communication device, 250 . . . travel zone holding unit, 251 . . . target position setting unit, 251A . . . stop target object detection unit, 251a . . . bund detection unit, 251B . . . node setting unit, 251C . . . intersection setting unit, 251D . . . specific point setting unit, 252 . . . distance measurement unit, 253 . . . autonomous travel control unit, 253A . . . direction computing unit, 253B . . . target path follow-up unit, 253B1 . . . target torque generation unit, 253B2 . . . target steering angle generation unit, 253C . . . inclination computing unit, 311A . . . travel-permitted zone setting unit, 311B . . . traffic-control-demanded vehicle speed determination unit, 311C . . . server-side communication control unit, 314A . . . route data storage unit, 314B . . . operation management information database, 320 . . . route data, 321 . . . travel zone, 340 . . . server-side communication device

The invention claimed is:

1. A travel control system for a work vehicle that is connected via a wireless communication network to a traffic control server, which performs operation management, and in accordance with an instruction from the traffic control server, autonomously travels in a particular travel area specified beforehand, said travel control system being to be provided in the work vehicle to control a travel of the work vehicle, and comprising:
 a travel zone holding unit configured to hold a travel zone which is set in the particular travel area and over which the work vehicle is to autonomously travel;
 a target position setting unit configured to set, on an outer side of the particular travel area, a target position that the work vehicle is to reach;
 a distance measurement unit configured to measure a traveling distance of the work vehicle from a position of the work vehicle as acquired using a position acquisition device provided in the work vehicle to the target position set by the target position setting unit; and
 an autonomous travel control unit configured to control the work vehicle so that the work vehicle moves to an outer side of the travel zone held by the travel zone holding unit and autonomously travels the traveling distance, which has been measured by the distance measurement unit, toward the target position.

2. The travel control system according to claim 1, wherein:
 the travel zone is defined using plural nodes, which indicate individual points along a travel route of the work vehicle, and links connecting the individual nodes; and
 the target position setting unit comprises:
 a stop target object detection unit configured to detect a stop target object that serves as an object for stopping the work vehicle,
 a node setting unit configured to set a first one of the plural nodes, said first node being to be passed through when the work vehicle moves to the outer side of the travel zone, and
 an intersection setting unit configured to set, as the target position, an intersection between a line, which is connected by a second one of the plural nodes, said second node being other than the first node set by the node setting unit, and the first node, and the stop target object detected by the stop target object detection unit.

3. The travel control system according to claim 1, wherein:
 the target position setting unit comprises:
 a stop target object detection unit configured to detect a stop target object that serves as an object for stopping the work vehicle, and
 a specific point setting unit configured to set, as the target position, a specific point on the stop target object detected by the stop target object detection unit; and
 the autonomous travel control unit comprises:
 an inclination computing unit configured to compute an inclination to an axle of the work vehicle at the stop target object detected by the stop target object detection unit,
 wherein, when the work vehicle has moved to the outer side of the travel zone held by the travel zone holding unit and has reached the target position, the work vehicle is allowed to autonomously travel so that the inclination computed by the inclination computing unit becomes smaller.

4. The travel control system according to claim 2, wherein:
 the second node is another one of the plural nodes, said another node being adjacent the first node set by the node setting unit.

5. The travel control system according to claim 2, wherein:
 the autonomous travel control unit allows the work vehicle to reach the intersection while being allowed to reverse, when the work vehicle moves to the outer side of the travel zone held by the travel zone holding unit.

6. A work vehicle that is connected via a wireless communication network to a traffic control server, which performs operation management, and in accordance with an instruction from the traffic control server, autonomously travels in a particular travel area specified beforehand, said work vehicle comprising:
 a position acquisition device configured to acquire a position of the own vehicle;
 a travel zone holding unit configured to hold a travel zone which is set in the particular travel area and over which the work vehicle is to autonomously travel;
 a target position setting unit configured to set, on an outer side of the particular travel area, a target position that the work vehicle is to reach;
 a distance measurement unit configured to measure a traveling distance of the work vehicle from the position of the work vehicle as acquired by the position acquisition device to the target position set by the target position setting unit; and an autonomous travel control unit configure to control the work vehicle so that the work vehicle moves to an outer side of the travel zone held by the travel zone holding unit and autonomously travels the traveling distance, which has been measured by the distance measurement unit, toward the target position.

* * * * *